(12) United States Patent
Knox

(10) Patent No.: US 6,918,458 B2
(45) Date of Patent: Jul. 19, 2005

(54) LOAD MANAGEMENT SYSTEM AND METHOD FOR MOTOR VEHICLE RESTRAINTS

(75) Inventor: Matthew J. Knox, Romulus, MI (US)

(73) Assignee: Autoliv ASP, Inc., Ogden, UT (US)

( * ) Notice: Subject to any disclaimer, the term of this patent is extended or adjusted under 35 U.S.C. 154(b) by 215 days.

(21) Appl. No.: 09/976,299

(22) Filed: Oct. 12, 2001

(65) Prior Publication Data

US 2003/0071444 A1 Apr. 17, 2003

(51) Int. Cl.[7] ............................................. B60R 21/32
(52) U.S. Cl. ...................................... 180/268; 280/735
(58) Field of Search ................................ 280/734, 735, 280/806; 180/268, 273, 282; 701/45

(56) References Cited

U.S. PATENT DOCUMENTS

| | | | |
|---|---|---|---|
| 3,740,711 A | * 6/1973 | Bell ........................ 340/457.1 |
| 5,309,436 A | 5/1994 | Hirano et al. |
| 5,338,063 A | * 8/1994 | Takeuchi et al. ............ 280/735 |
| 5,346,152 A | * 9/1994 | Fohl ............................ 242/371 |
| 5,552,986 A | * 9/1996 | Omura et al. ................. 701/45 |
| 5,742,986 A | * 4/1998 | Corrion et al. ............... 24/633 |
| 5,977,653 A | 11/1999 | Schmid et al. |
| 6,203,059 B1 | * 3/2001 | Mazur et al. ................ 280/735 |
| 6,212,457 B1 | * 4/2001 | Miciuda et al. ................ 701/45 |
| 6,213,512 B1 | * 4/2001 | Swann et al. ................ 280/806 |
| 6,229,437 B1 | 5/2001 | Schmid et al. |
| 6,242,820 B1 | * 6/2001 | Shankar et al. ............. 307/10.1 |
| 6,243,634 B1 | * 6/2001 | Oestreicher et al. .......... 701/45 |
| 6,295,494 B1 | 9/2001 | Nitschke et al. |
| 6,302,439 B1 | * 10/2001 | McCurdy ..................... 280/735 |
| 6,341,252 B1 | * 1/2002 | Foo et al. ..................... 701/45 |
| 6,467,804 B2 | * 10/2002 | Sakai et al. .................. 280/735 |

FOREIGN PATENT DOCUMENTS

| | | |
|---|---|---|
| GB | 2290682 | 1/1996 |
| WO | WO 98/09845 | 3/1998 |

* cited by examiner

Primary Examiner—David R. Dunn
(74) Attorney, Agent, or Firm—Sally J. Brown (57) ABSTRACT

A load management system and method for controlling the activation sequence and times of activation of motor vehicle occupant restraints when a high g event, such as a crash, occurs. The system includes a microprocessor that processes inputs from a number of devices including seat weight sensor, an occupant spatial position detector, a buckle status detector, a belt sensor. The microprocessor is driven by a load management procedure that includes a high g event routine that controls the activation sequence of restraints so that the automatic locking restraint is first activated, followed by the pre-tensioner and then by the air bag. The load management procedure also includes an enable/disable procedure that controls the enabling and disabling of the restraints according to a number of variables including occupant weight, seat buckle status and belt extension status.

22 Claims, 11 Drawing Sheets

LOAD MANAGEMENT SYSTEM AND METHOD FOR MOTOR VEHICLE RESTRAINTS

FIELD OF INVENTION

This invention relates to a method and apparatus for controlling occupant restraints in a motor vehicle. In one aspect, the invention relates to the control of the actuation timing and sequence of the occupant restraints and in another aspect to the enablement/disablement of the occupant restraints.

BACKGROUND OF INVENTION

Motor vehicle occupants are protected from high acceleration (high g) events, such as crashes, by primary restraints and supplemental restraints. Primary restraints are belts and buckles that secure an occupant to a seat, but allow limited motion. When a high g event occurs, an automatic locking restraint is actuated to prevent the belt spooling mechanism from spooling out any more belt.

Supplemental restraints include frontal and side inflatable passenger restraints (IPRs) or air bags, belt pre-tensioners, knee restraints and the like.

The pre-tensioner is actuated to take up slack from the belt when a high g event occurs. This actuation occurs about 0–5 ms after the high g event begins. The air bags are actuated about 5–10 ms or so later.

Typically, primary and supplemental restraints operate independently of one another. The decision of when to fire a pre-tensioner or an automatic locking restraint is dependent upon their individual response times to a high g event. Generally, the pre-tensioner actuates first to take up belt slack and the automatic locking restraint actuates thereafter. This results in a slackening of the belt followed by undesired spooling out of the belt before the automatic locking restraint actuates.

IPR actuation is generally controlled by a controller in response to a high g event, occupant weight and occupant position. For example, International Patent application PCT/US98/09845 discloses an air bag control system that controls air bag inflation responsive to the force exerted on a vehicle seat, tension sensed in seat belt, and proximity of the occupant to the inflator door. However, there is no provision to control the actuation sequence and times of a pre-tensioner and an automatic locking restraint and the actuation time of the air bag relative thereto.

An object of the present invention is to provide a load management system for the synchronous control of occupant restraints in a motor vehicle.

Another object of this invention is to provide a method of controlling the occupant restraints of a motor vehicle in a synchronous manner.

Another object of the present invention is to provide a method of controlling the enablement and disablement of the occupant restraints of a motor vehicle.

Another object of the present invention is to provide a system that controls the enablement and disablement of the occupant restraints of a motor vehicle.

Still another object of the present invention is to provide a memory medium that contains a program for controlling a processor according to the method embodiments of the invention.

SUMMARY OF INVENTION

The load management system of the present invention controls the sequence of activation of occupant restraints in a motor vehicle such that automatic locking restraint is actuated first, the pre-tensioner is actuated second and the air bag is actuated last.

The load management system of the present invention includes a load management procedure that includes a high g response routine and an enable/disable procedure. The high g response routine controls the actuation of the occupant restraints, if enabled, in the above sequence.

An enable/disable procedure of the invention controls the enablement and/or disablement of the occupant restraints according to a set of variables including occupant weight, seat buckle status, occupant spatial position and the like. According to one aspect of the invention, the restraints are enabled or disabled dependent on whether the seat buckle is buckled or unbuckled. If the weight in the seat is less than a threshold, the procedure enters into a child procedure that enables and/or disables the occupant restraints. If the weight is equal to or greater than the threshold, the procedure enters into an adult procedure that enables and/or disables the occupant restraints.

According to another aspect of the invention, it is determined if the seat belt of a seat is buckled and if the seat is unoccupied. If so, the unoccupied status of the seat is recorded. At least one occupant restraint is enabled or disabled.

According to another aspect of the invention, a weight in the seat is determined from measurements obtained from a weight sensor system. Tension or tightening in a seat belt of the seat is determined by comparing the values obtained by the weight sensor system at about the rear right and rear left of the seat. If the comparison value exceeds a predetermined value, an adjusted weight is derived. If the adjusted weight is less than a threshold weight, the air bag is disabled.

The system of the invention includes a processor that runs a program that includes the above methods of the invention.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
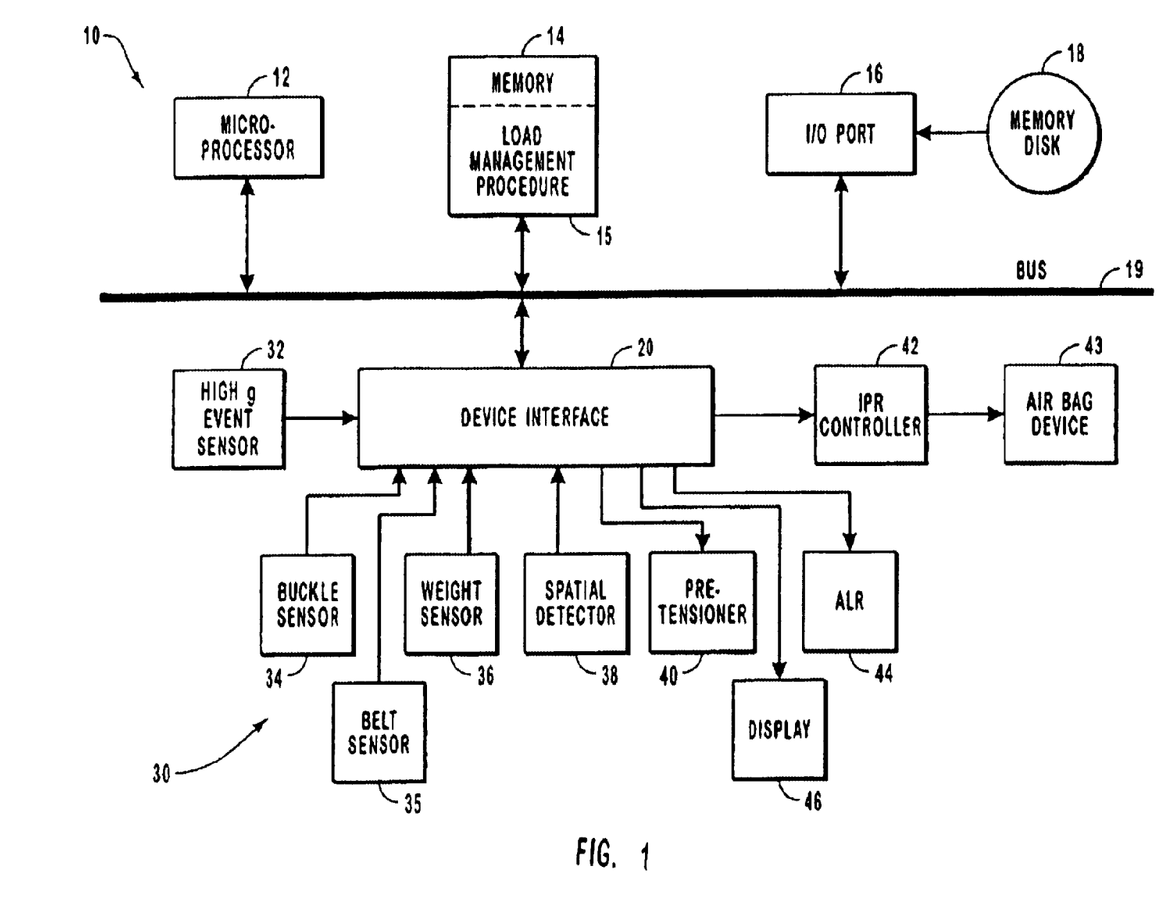
FIG. 1 is a block diagram of a load management system according to the present invention.

With reference to FIG. 1, there is provided a load management system generally represented by numeral 10. Load management system 10 is intended for installation in a motor vehicle to control the operation of primary and supplemental restraints. Load management system 10 includes a microprocessor 12, a memory 14, an input/output (I/O) port 16, a device interface 20 and a plurality of devices 30, all of which are interconnected by a computer bus 19.

Memory 14 has stored therein a load management procedure 15. Load management procedure 15 may be installed in memory 14 by means of a memory disk 18 via I/O port 16 under control of microprocessor 12 at the time of manufacture or other suitable time. That is, memory disk 18 has stored thereon load management procedure 15. Memory 14 may suitably be a random access memory (RAM) and/or may include non-volatile memory such as an EPROM.

Devices 30 include a high g event sensor 32, a buckle sensor 34, a belt sensor 35, a weight sensor 36, a spatial detector 38, a pre-tensioner 40, and IPR controller 42, an automatic locking restraint (ALR) 44 and a display 46. High g event sensor 32 may suitably be an accelerator that gives an output signal with an amplitude that is proportional to the acceleration or g force imparted by an event such as a crash. Buckle sensor 34 provides a signal that indicates the seat belt is buckled or not buckled. Belt sensor 35 is any suitable sensor that indicates the amount of belt that has been spooled out by the seat belt system of the motor vehicle. Weight sensor 36 is any suitable weight sensor that gives an output signal indicative of the weight of an occupant in a seat of a motor vehicle. Spatial sensor 36 is any suitable sensor that detects the spatial position of the seat occupant.

Pre-tensioner 40 is any suitable pre-tensioner that takes up slack of a seat belt upon command. For example, it may be a conventional pre-tensioner that is controlled by operation of a solenoid or other suitable electrically controlled device. ALR 44 may be a conventional ALR that is controlled by operation of solenoid or other suitable electrically controlled device. IPR controller 42 is a conventional air bag controller with the capability of being enabled for operation in a regular mode or a staged mode to control an air bag device 43. Display 46 is, for example, a panel display that may be situated at any convenient location in the motor vehicle.

It will be apparent to those skilled in the art that, though shown as a separate controller, IPR controller 42 can be incorporated into microprocessor 12, memory 14 and device interface 20. Also, it will be apparent to those skilled in the art that separate restraints are provided for each seat in the motor vehicle.

Microprocessor 12 under the direction of programs stored in memory 14 receives input data from the various sensors 32 through 38, processes such data and controls occupant restraints 40 through 46. In particular, a load management procedure 15 is stored in memory 14. Microprocessor 12 under the direction of load management procedure 15 controls occupant restraints 40, 42, 43, and 44 for each seat in a manner that manages their actuation sequence and actuation times when a high g event occurs.

According to the present invention, the actuation sequence is to first actuate ALR 44 so as to prevent any more belt being released or spooled out by the belt restraint. Next, pre-tensioner 40 is actuated to take up belt slack. The effect of this sequence of actuation is that the occupant is forced and held closely to the seat cushion and seat back for the duration of the high g event. Air bag device 43 is then subsequently activated at a time determined by variables, such as seat belt buckled or unbuckled and weight, size and spatial position of the occupant.

Figure 2:
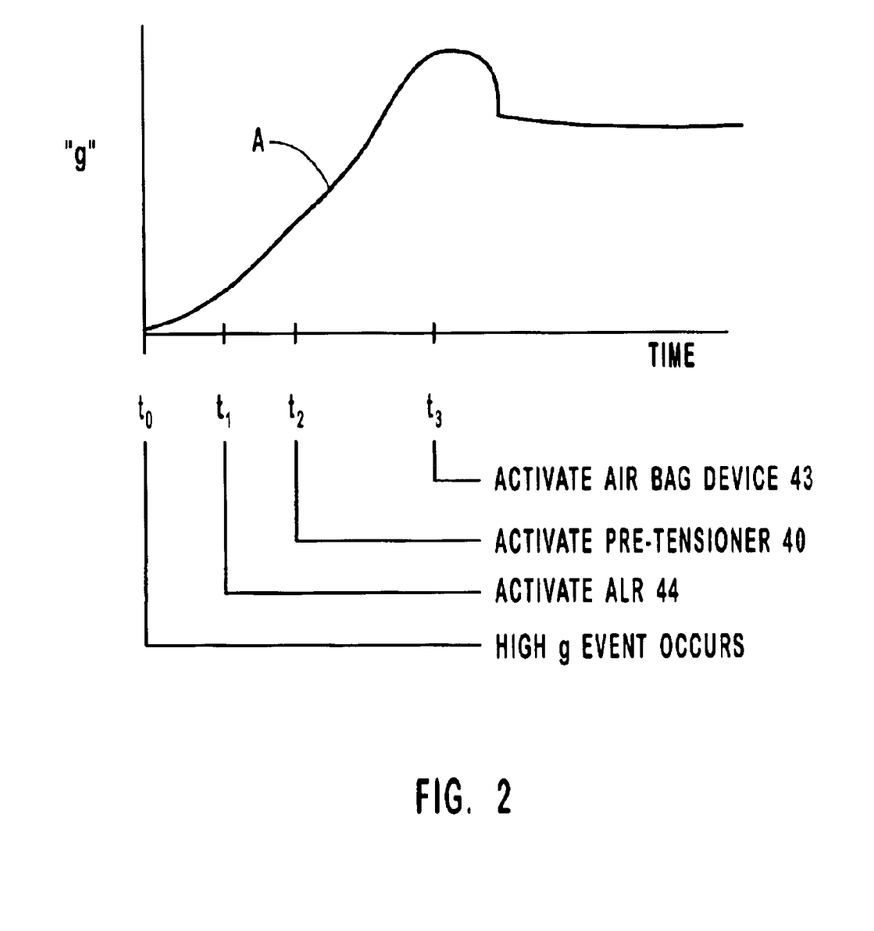
FIG. 2 is a graph of acceleration versus time for a high g event.

Referring to FIG. 2, curve A represents an acceleration response to the occurrence of a high g event. The high g event occurs at time t0. ALR 44 is activated at time t1, pre-tensioner 40 is activated at time t2 and air bag device 43 is activated at time t3. Any one or more of ALR 44, pretensioner 40 or airbag device 43 can be enabled prior to the occurrence of the high g event.

In one design embodying the present invention, t1 is about 5 ms, t2 is about 10 ms and t3 is in a range of about 18 to 22 ms.

In other embodiments of the invention, radar or other similar technology can be used to detect a high g event before it occurs. In such embodiments, ALR 44 can be activated prior to the occurrence of the high g event. Pre-tensioner 40 and/or air bag device 43 can be activated either before or after the occurrence of the high g event.

Figure 3:
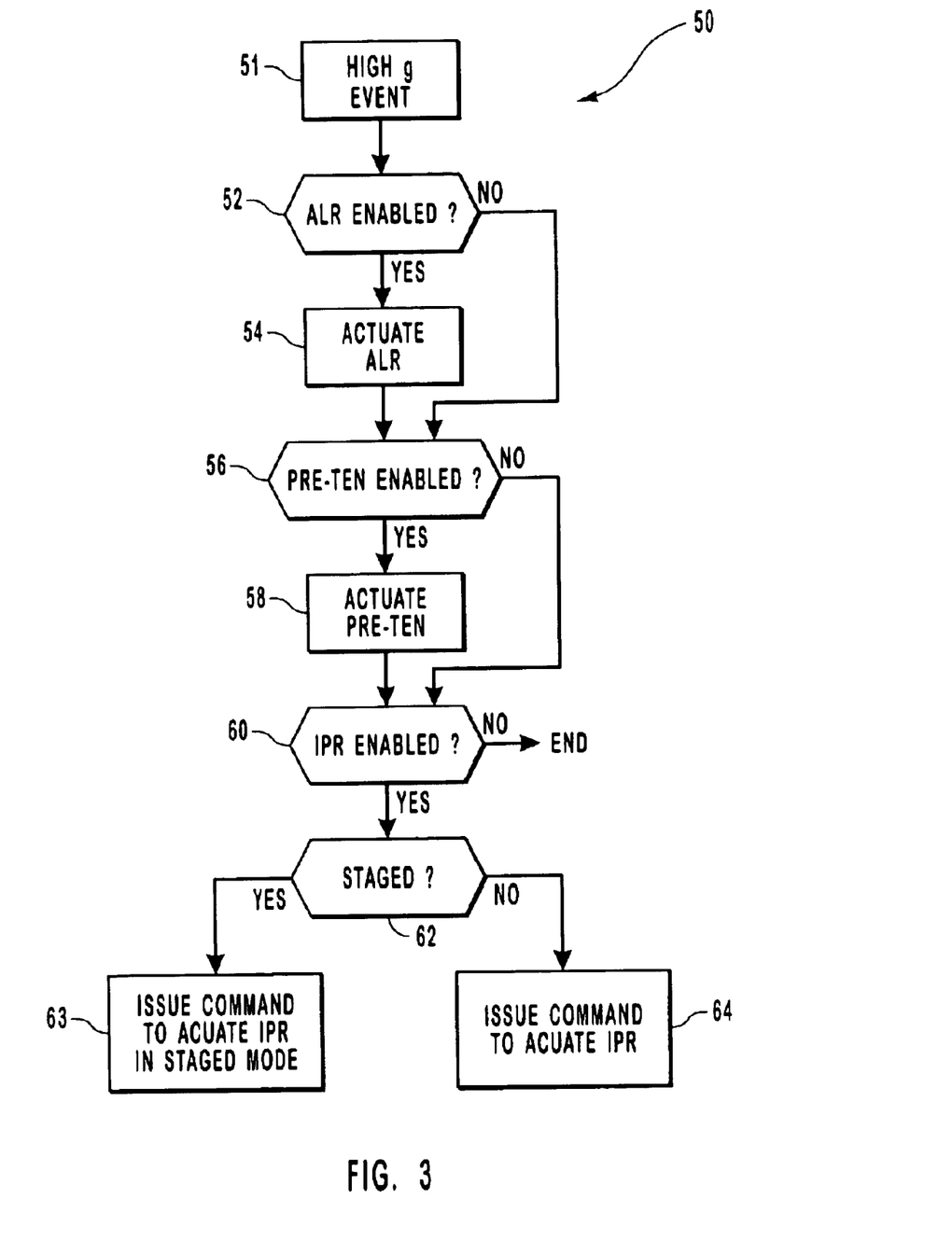
FIG. 3 is a flow diagram of a high g response routine of the load management procedure of FIG. 1.

Referring to FIG. 3, load management procedure 15 has a high g response routine 50 that begins at step 51 with the detection of a high g event by high g event sensor 34. At step 52 it is determined if ALR is to be enabled. If yes, step 54 actuates ALR 44. If step 52 determines that ALR is not to be enabled, step 54 is bypassed to step 56. Step 56 determines if pre-tensioner is to be enabled. If yes, step 58 actuates pre-tensioner 40. If step 56 determines that pre-tensioner is not to be enabled, step 58 is bypassed to step 60. Step determines if IPR is to be enabled. If not, air bag device 43 is not actuated. Then, high g response routine 50 ends.

If step 60 determines that IPR is enabled, step 62 determines if the air bag is to be actuated in a staged mode. If yes, step 63 issues a command to activate IPR in a staged mode. If step 62 determines that the air bag is not to be actuated in a staged mode, step 64 issues a command to actuate IPR in a regular mode.

Figure 4:
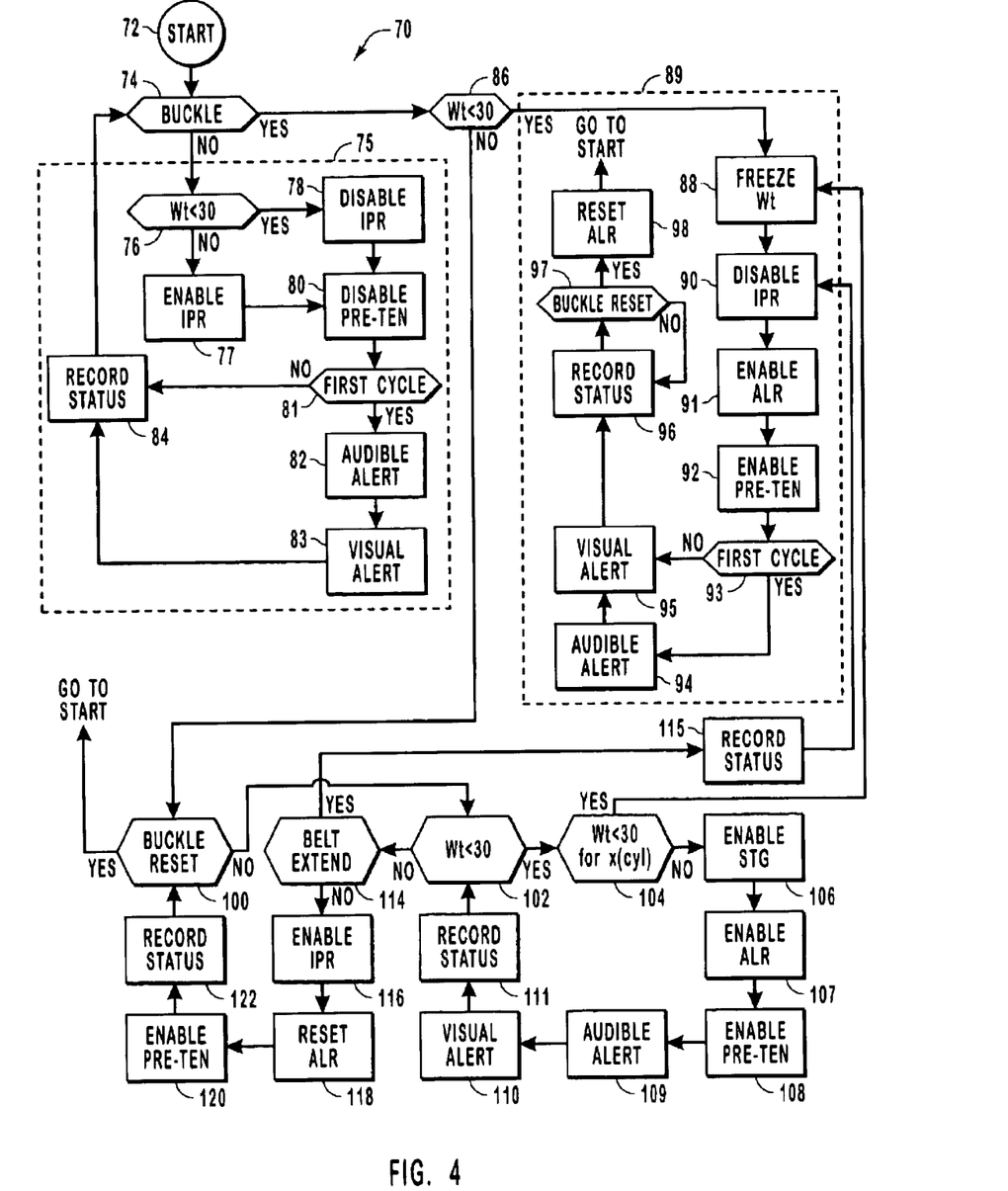
FIG. 4 is a flow diagram of the load management enable/disable procedure of the invention.

Referring to FIG. 4, load management procedure 15 includes an enable/disable routine 70 that controls the enabling of pre-tensioner 40, ALR 44 and air bag device 43. Enable/disable routine 70 begins at step 72 when a change occurs that may signify an occupant is seated or is about to be seated. For example, start step 72 can be triggered by such events as a vehicle door being opened, ignition being turned on, occupant in a seat, seat buckle reset and the like.

At step 74, it is determined if the buckle is buckled. Step 74 is periodically performed at a suitable rate. For example, step 74 is performed at a 4 Hz rate or once every 250 milliseconds. If step 74 determines that the buckle is not buckled, an unbuckled adult/child procedure 75 is performed. Unbuckled adult/child procedure 75 begins with step 76 that determines if the occupant weight is less than a predetermined limit or threshold, which, for this example is 30 kilograms. If yes, step 78 next disables the IPR or air bag. If step 76 determines that the occupant weight is not less than (equal to or greater) than 30 kilograms, step 77 enables the IPR. After either step 77 or step 78 has been performed, step 80 then disables pre-tensioner 38. Next, step 81 determines if this is the first cycle. If yes, step 82 activates an audible alert and step 83 activates a visual alert. These alerts signify that a child or a child seat may be in the seat.

If step 81 determines that this is not the first cycle, step 84 records the status of an under limit occupant of the seat and belt unbuckled. Step 74 once again determines if the buckle is buckled. If not, the process defined by steps 76 through 81 and 84 is reiterated until the buckle is buckled or the occupant is removed from the seat.

If step 74 determines that the buckle is buckled, step 86 determines if the occupant weight is less than 30 kilograms.

If yes, step 88 freezes the occupant weight and decision. A buckled child procedure 89 is then performed. Buckled child procedure 89 begins with step 90 that disables the IPR. Step 91 enables the ALR. Step 92 then enables the pre-tensioner. Next, step 93 determines if this is the first cycle. If yes, step 94 issues an audible alert. If no, step 95 issues a visual alert. Step 95 also issues a visual alert after step 94 during the first cycle. Step 96 then records the status of occupant weight (<30kg), IRP disable and ALR and pre-tensioner enabled. Step 97 then determines if the buckle has been reset. If there has been a change in buckle status, the change is recorded by step 96. Step 97 again determines if there is a change in buckle status. If the status has not changed, the ALR is reset by step 98 and the enable/disable routine returns to the start step 72. The sequence of steps 72, 74, and 86 through 98 reiterates until the buckle status changes, the occupant weight changes or the occupant is removed from the seat.

When ALR has been enabled, the system can then manage belt displacement based on the known occupant weight.

If step 86 determines that the occupant weight is equal to or greater than 30 kilograms, step 100 then determines if there has been a change in buckle status. If yes, enable/disable routine returns to the start step 72. If step 100 determines that the buckle is still buckled, step 102 determines if the occupant weight is less than 30 kilograms. If yes, step 104 determines if the occupant weight has been less than 30 kilograms for a number x of cycles. If not, step 106 enables a staged mode of air bag operation. Step 107 then enables the ALR. Step 108 then enables the pre-tensioner. Step 109 issues an audible alert. Step 110 issues a visual alert. Step 111 records the status. Next step 102 determines if the occupant weight is less than 30 kilograms. If yes, the process of steps 104 through 111 and 102 reiterates until step 102 determines that the occupant weight is greater than 30 kilograms or step 104 determines that the occupant weight has been less than 30 kilograms for x cycles.

If step 104 determines that the occupant weight has been less than 30 kilograms for x cycles, step 88 will then freeze the weight and steps 90 through 98 will then be performed.

If step 102 determines that the occupant weight is equal to or greater than 30 kilograms, step 114 then determines if the belt is extended. If yes, step 115 records the status. Steps 90 through 98 are then performed before enable/disable routine 70 returns to start step 72.

If step 114 determines that the belt is not extended, step 116 enables the IPR. Step 118 resets the ALR. Step 120 next enables the pre-tensioner. Step 122 records the status. Step 100 then determines if there has been a change in buckle status. If the buckle is still buckled, step 102 begins another cycle of steps 104, 114 and 116 through 122. These cycles reiterate until step 100 determines that the buckle has been unbuckled, step 114 determines that the belt is extended or step 102 determines the occupant weight is less than 30 kilograms.

If step 100 determines that the buckle has been unbuckled, enable/disable routine 70 returns to start step 72.

Figure 5:
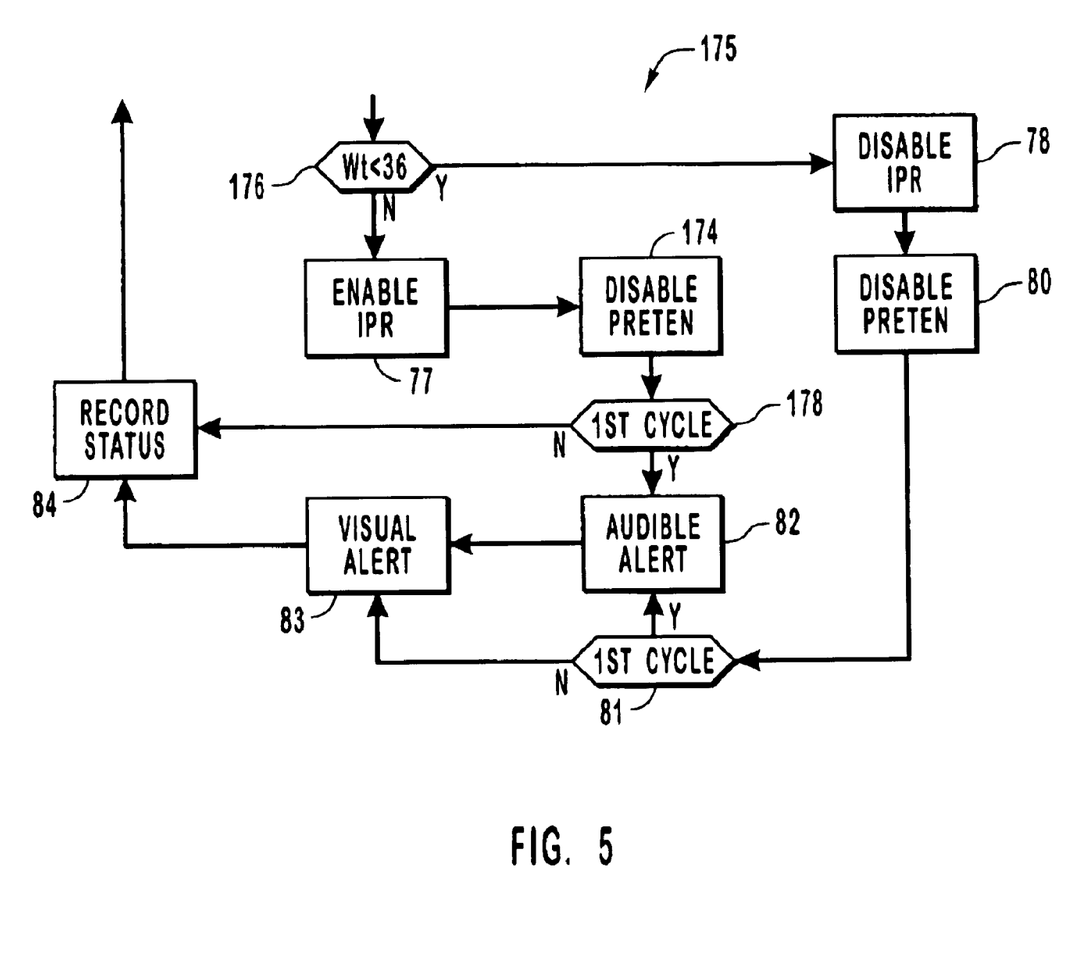
FIG. 5 is a flow diagram of an alternate unbuckled adult/child process of the enable/disable procedure of FIG. 4.

Referring to FIG. 5, an alternative unbuckled adult/child procedure 175 is shown in which some of the steps bear the same reference numerals of substantially identical steps of unbuckled adult/child procedure 75. Unbuckled adult/child procedure 175 begins with step 176 that determines if the weight in the seat is less than a threshold, which for this example is 36 kilograms. If the weight is less than the threshold, steps 78 and 80 disable the IPR and the pre-tensioner. Step 81 determines if this is the first cycle of unbuckle adult/child procedure 175. If yes, steps 82 and 83 signal an audible alert and a visual alert. Step 84 records the status of steps 176, 78 and 80 through 83 and returns to step 74 (see FIG. 4 or FIG. 8). If step 74 again determines that the seat belt is unbuckled, a new cycle of unbuckled adult/child procedure 175 is initiated. The step sequence of 176, 78, 80 and 81 is repeated. This time step 81 determines that this is not the first cycle. Step 84 is performed and procedure 175 returns to step 74.

If step 176 determines that the weight in the seat is equal to or greater than the threshold of 36 kilograms, step 77 enables the IPR and step 174 disables the pre-tensioner. Step 178 determines if this is the first cycle of unbuckled adult/child procedure 175. If yes, steps 82 and 83 signal an audible alert and a visual alert. Step 84 records the status of steps 176, 77, 174 and 178 and returns to step 74 (see FIG. 4 or FIG. 8). If step 74 again determines that the seat belt is unbuckled, a new cycle of unbuckled adult/child procedure 175 is initiated. The step sequence of 176, 77, 174 and 178 is repeated. This time step 178 determines that this is not the first cycle. Step 84 is performed and procedure 175 returns to step 74. Procedure 175 continues to reiterate until the seat belt is buckled or the occupant is removed from the seat.

Figure 6:
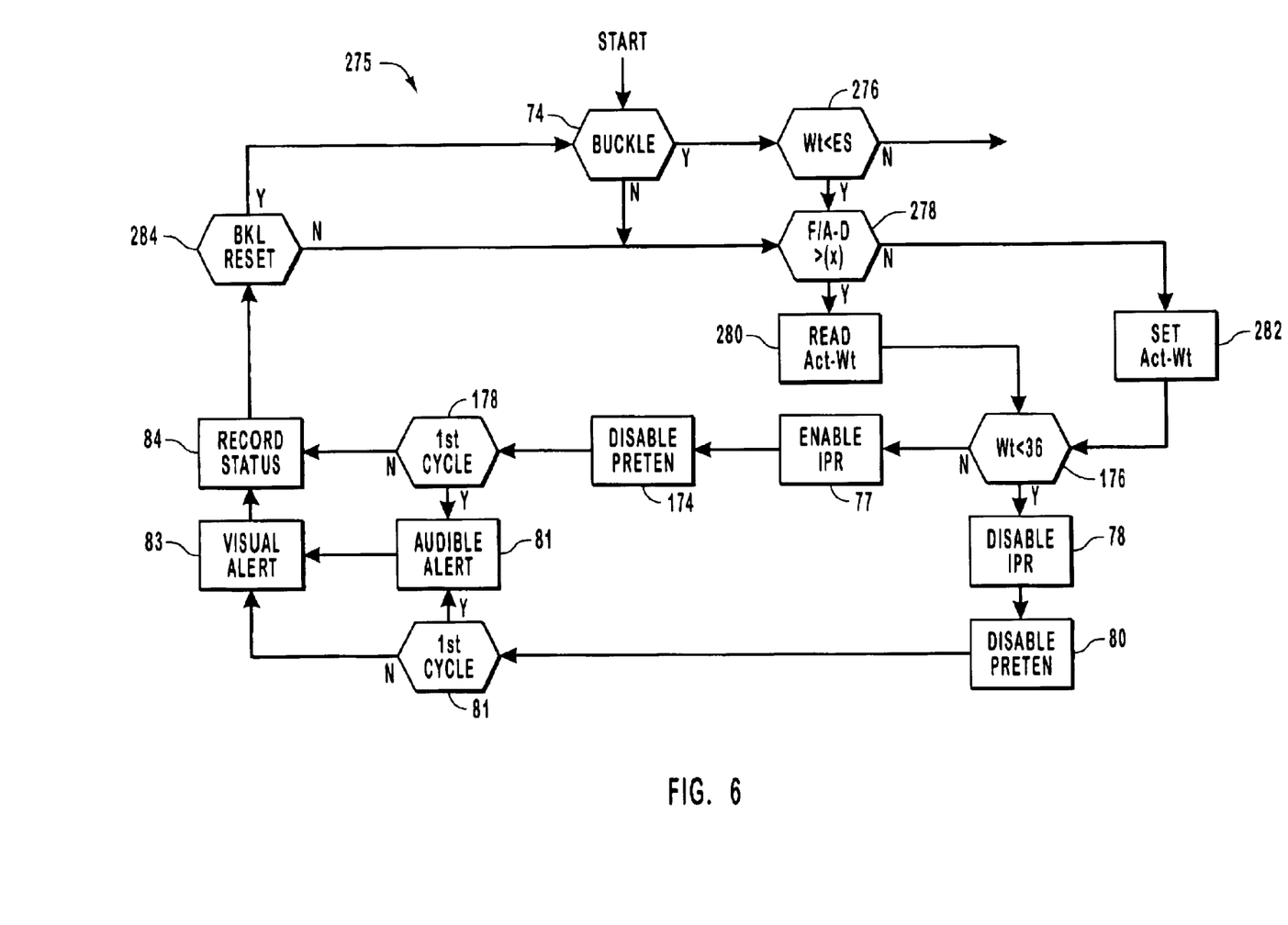
FIG. 6 is a flow diagram of an alternate adult/child process of the enable/disable procedure of FIG. 4.

Referring to FIG. 6, an adult/child procedure 275 is shown in which some of the steps bear the same reference numerals of substantially identical steps of unbuckled adult/child procedures 75 and 175. Adult/child procedure 275 is able to perform the unbuckled adult/child procedure as described above and also to detect whether an occupant is trying to defeat or abuse the seat belt system. Thus, if step 74 detects that the buckle has been buckled, step 276 determines if the weight is less than an empty seat threshold ES, e.g., about 1.8 Kg. If greater, the occupant is assumed in the seat at the time of buckle and the program moves on to step 86 of FIG. 4 or to step 202 of FIG. 8.

If step 276 determines that the occupant weight is less than ES, the occupant is assumed not in the seat at the time of buckle. Step 278 responds to this condition or an unbuckle detection by step 74 to determine if the fore/aft (F/A) adverse loading conditions are greater than x. The loading parameter x is a deviation of a predetermined percentage (e.g., 17%) from a normal loading of weight sensors, for example, four balanced weight sensor cells located at the four corners of the seat. If no, there is no adverse loading and step 282 reads the actual weight and stores it in a memory bank. The weight values in the memory bank are then used to derive a normalized weight for use by the system.

Steps 176, 78, 80, 81, 82, 83 and 84 are then performed as described above for unbuckled adult/child procedure 175. Step 284 determines if the buckle has been reset (unbuckled). If not, the system continues to cycle in the loop that includes steps 278, 280 or 282, 176, 78, 80, 81, 82, 83, 84, 77, 174, 178 and 284. If step 278 detects an imbalance or adverse loading condition, step 280 reads the normalized weight from the memory bank. If this weight is less than 36 Kg, the occupant is a child. Steps 78 and 80 disable the IPR and the pre-tensioner. On the other hand, if the weight is 36 Kg or higher, the occupant is an adult. Step 77 enables the IPR and step 174 disables the pre-tensioner. The system continues to cycle in the loop until step 284 determines that the buckle has been reset, in which case step 74 is performed at the start of a new cycle. If during any cycle, step 278 detects no imbalance, step 282 is performed instead of step 280 and a new weight value is inserted in the memory bank so as to adjust the normalized weight value.

If step 74 detects that the seat belt is unbuckled, step 278 determines if there is adverse loading. If not, step 282 reads actual weight and enters it into the memory bank. If step 278 detects adverse loading, step 280 reads the normalized weight value from the memory bank. The weight determined by step 280 or step 282 is used by step 176, which together with steps 78, 80, 81, 82, 83, 84, 77, 174 and 178 are performed as described for unbuckled adult/child procedure 175. Until the buckle is reset, step 284 will confine the sequence to the aforementioned loop of steps 278, 280 or 282, 176, 78, 80, 81, 82, 83, 84, 77, 174, 178 and 284.

Figure 7:
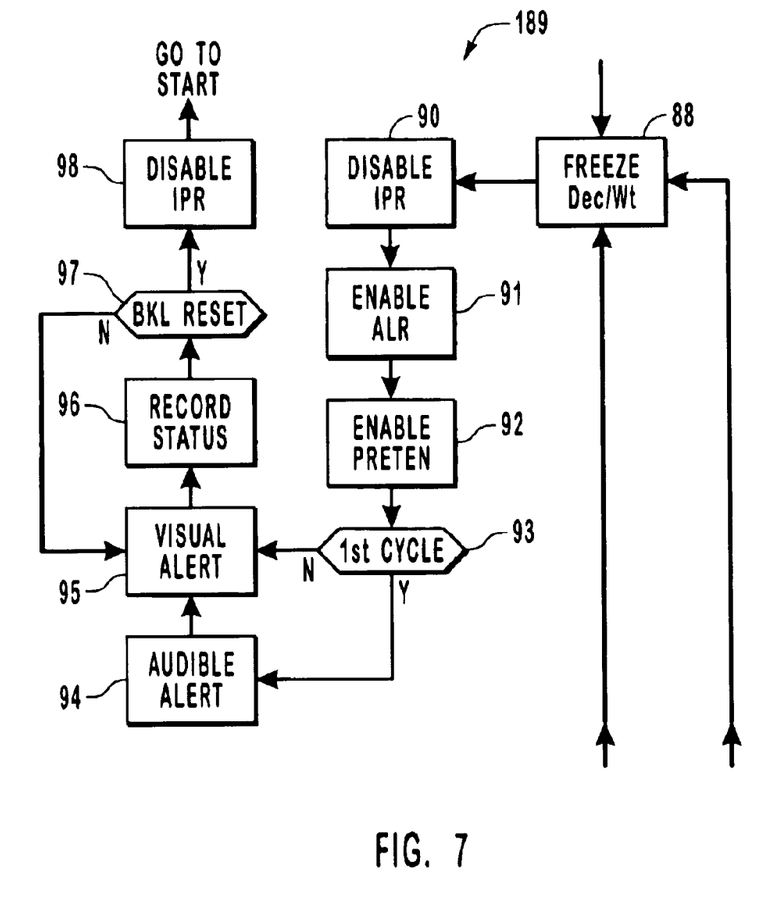
FIG. 7 is a flow diagram of an alternate buckled child process of the enable/disable procedure of FIG. 4.

Referring to FIG. 7, an alternative buckled child procedure 189 is shown that has the same steps as buckled child procedure 89, but differs therefrom in two aspects. First, all of the entry points into buckled child procedure 189 begin with step 88 that freezes the occupant weight. Second, if step 97 determines there has been no change in seat buckle status, step 95 provides a visual alert. Step 96 again records status. Procedure 189 continues in the step sequence of 95, 96 and 97 until the seat buckle is reset or unbuckled.

Figure 10:
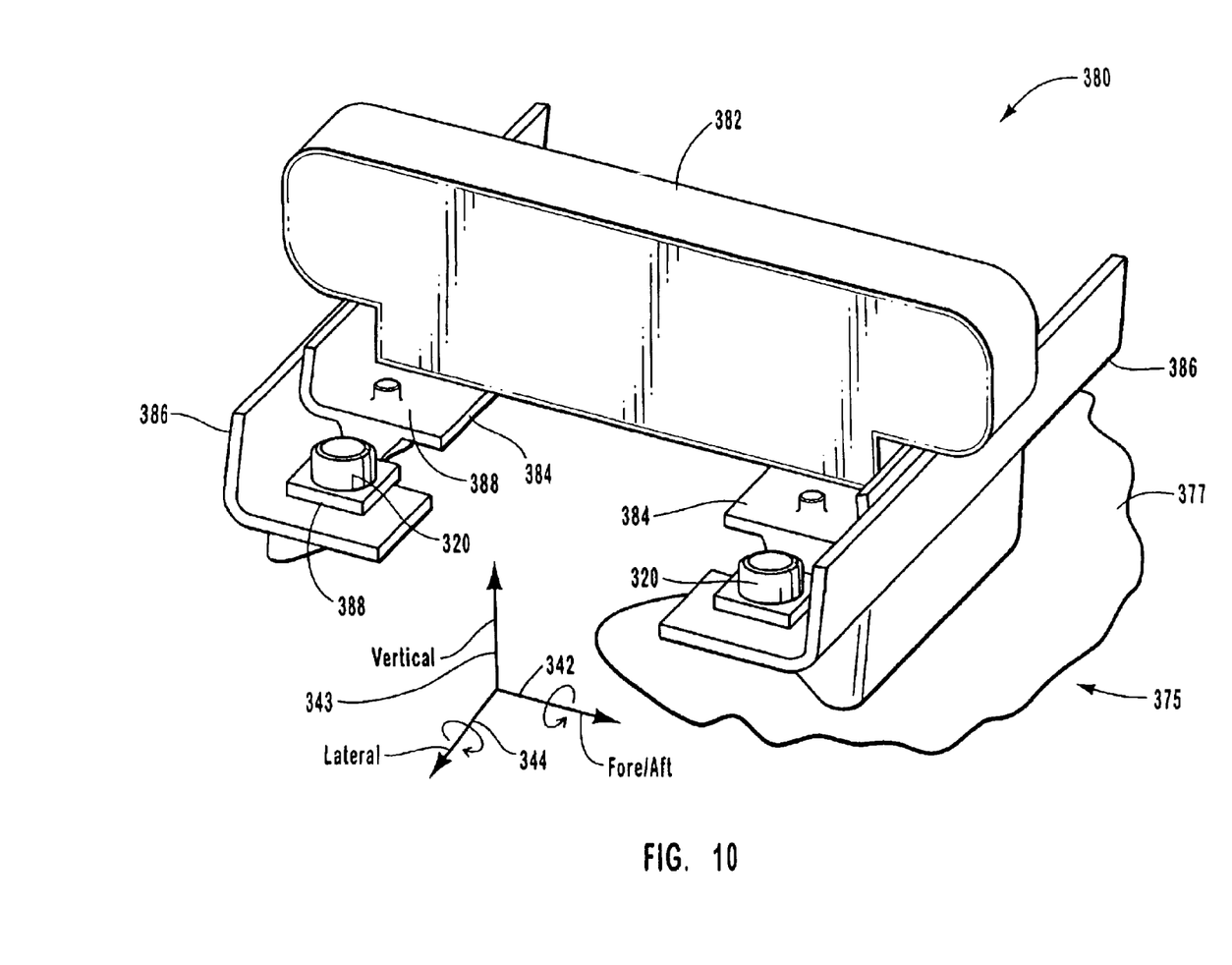
FIG. 10 is a diagram that depicts a motor vehicle seat with a weight sensor system.

The invention may be used with any type of motor vehicle seat with any suitable weight sensors or transducers. Referring to FIG. 10, by way of example, a plurality of transducers 320 are shown for a motor vehicle 375, of which only a portion of a floor 377 and a portion of a seat 380 are shown. Seat 380 includes a seat cushion 382, a seat bucket 384 and a pair of seat tracks 386. Though seat bucket 384 is shown as having two side members, it also includes front and rear members (not shown) arranged with the side members to form a rectangular bucket to support seat cushion 382. Seat tracks 386 are mounted on floor 377.

Transducers 320 mount seat bucket 384 to seat tracks 386 by a plurality of bolts 388. Although only two transducers 320 are shown in FIG. 10, preferably four transducers are used to obtain a reasonably accurate measurement of any weight in seat 380. Two of the transducers are mounted fore as shown in FIG. 10 and the other two are mounted aft. In the discussion that follows, the fore transducers 320 are referred to as front right (fr) and front left (fl) and the rear transducers are referred to as rear right (rr) and rear left (rl).

Fore/aft axis 342 and lateral axis 344 are shown in FIG. 10 together with a mutually perpendicular vertical axis 343. Transducers 320 sense weight forces A and B as applied along vertical axis 343.

Figure 8:
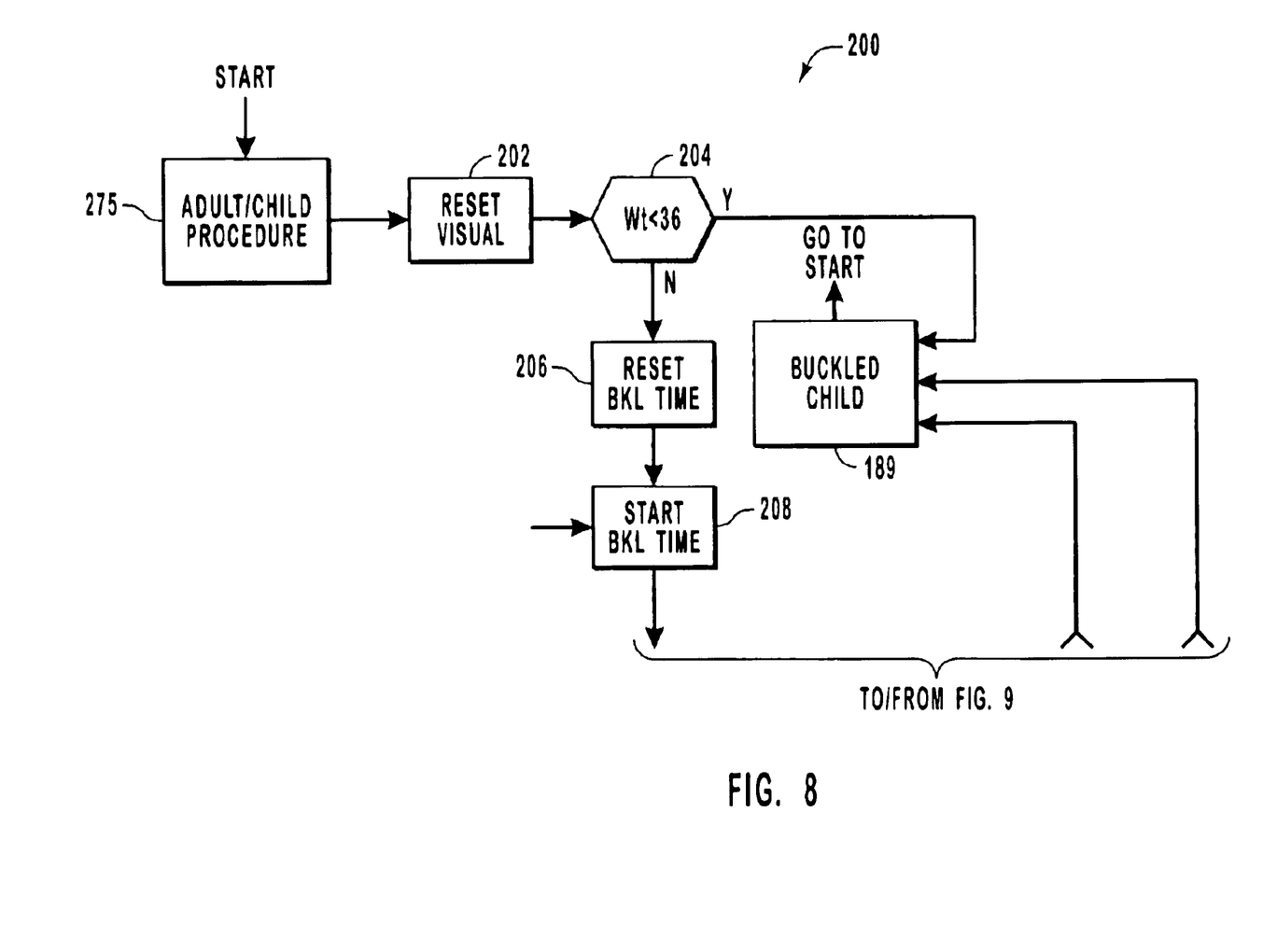
FIGS. 8 and 9 are flow diagrams of an alternate load management enable/disable procedure of the invention.
Figure 9:
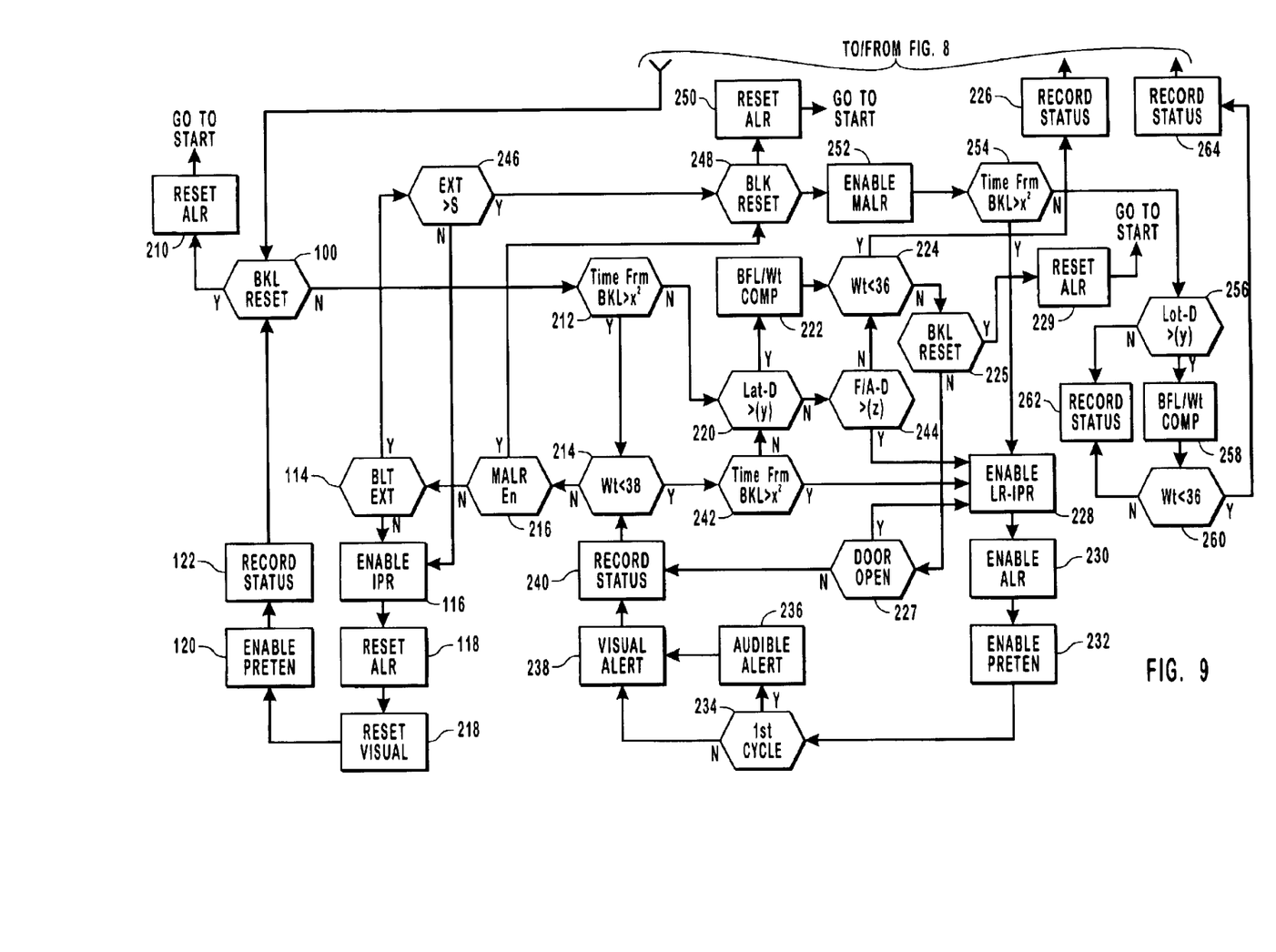

Referring to FIGS. 8 and 9, an alternate embodiment of enable/disable routine or procedure 70 is shown as an enable/disable procedure 200. In FIGS. 8 and 9, steps that are identical to steps of FIG. 4, 5, 6 or 7 bear like reference numerals. Referring first to FIG. 8, enable/disable procedure 200 begins with adult/child process 275 that processes unbuckled conditions as well as buckle, but seat unoccupied conditions. When adult/child procedure 275 determines that the seat belt is buckled and is occupied, step 202 resets visual alerts and step 204 determines if the weight in the seat is less than a threshold, which, for example, is 36 kilograms for the embodiment of FIGS. 8 and 9. If yes, buckled child procedure 189 is performed. It will be appreciated by those skilled in the art that step 74 and unbuckled adult/child procedure 75 or 175 can be used in place of adult/child procedure 275 and buckled child procedure 89 can be used in place of buckled child procedure 189.

If step 204 determines that the weight in the seat is equal to or greater than the threshold of 36 kilograms, step 206 resets a buckle time period and step 208 starts the buckle time period running. The buckle time period is in the range of about 0 to 30 seconds with a decision to be secured within 0 to 300 milliseconds. During the buckle time period, enable/disable procedure 200 performs a number of steps to validate or invalidate that the weight in seat actually is equal to or greater than the threshold weight.

Referring to FIG. 9, step 100 determines if the seat belt buckle has been reset. If yes, step 210 resets the ALR and returns to start. If step 100 determines that the buckle has not been reset, step 212 determines if the buckle time period is greater than x. That is, has the buckle time period expired. If yes, step 214 determines if the weight in the seat is less than 38 kilograms. In this example, 38 kilograms covers the enable and low risk evaluation range. While evaluating the low risk enable, an individual's weight is normalized. During this evaluation, a determination is made as to whether the weight is more often above or below the threshold. While evaluating this condition just after buckle, the occupant is provided a stages operation (low risk). If step 214 determines no, step 216 determines if manual ALR (MALR) is enabled. If no, step 114 determines if the seat belt is extended. If no, steps 116 through 122 are performed as an enable/disable procedure 70 except that after step 118, step 218 resets the visual alert.

If step 212 determines that the buckle time period has not expired, step 220 begins step sequence that evaluates belt loads and adverse loading conditions during the buckle time period that may require adjustments to the average sensed weight in the seat. Belt loading is detected by measuring the weight sensed at the rear of the seat, for example, by the rr and rl transducers 320 of FIG. 10.

Figure 11:
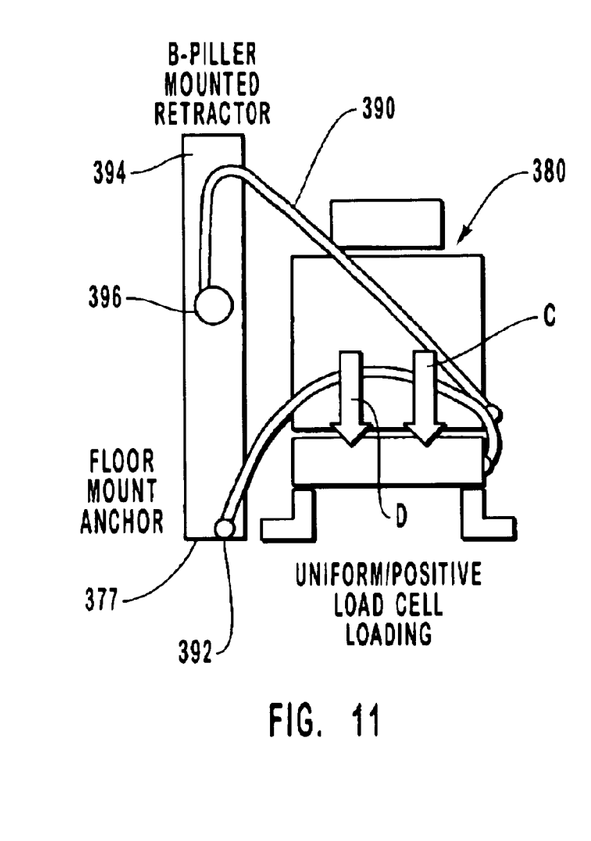
FIG. 11 depicts uniform positive load cell loading of a motor vehicle seat belt.

Referring to FIG. 11, a seat 380 has a seat belt 390 that is anchored to the seat cushion to the left side of seat 380, to floor 377 at 392 and to a pillar 394 at 396. In FIG. 11, the forces, illustrated by arrows C and D, and measured the rr and rl weight transducers (not shown in FIG. 11) are about the same to produce a uniform/positive load cell (weight sensor) loading.

Figure 12:
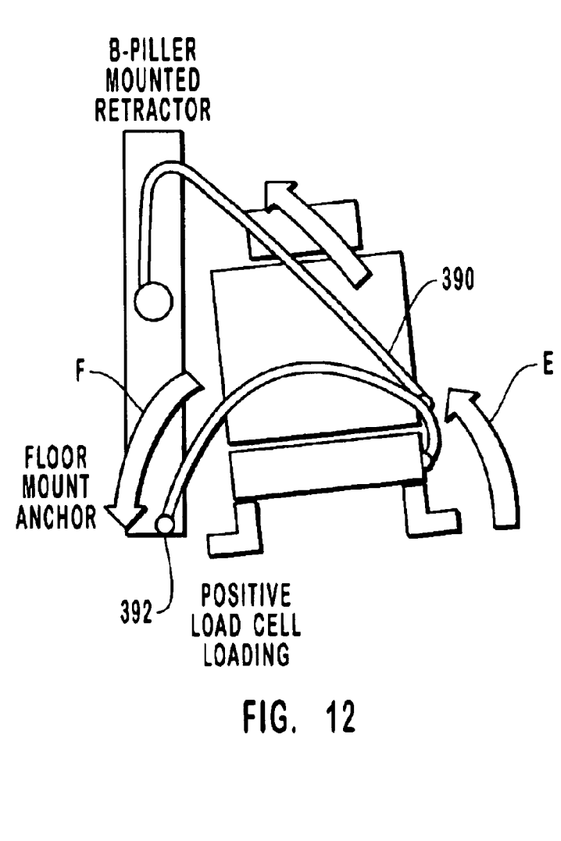
FIG. 12 depicts positive and negative load cell loading of a motor vehicle seat and seat belt.

Referring to FIG. 12, a negative load cell loading that is produced by a tightening of seat belt 390 at the rear left side of seat 380 is shown by arrow E. A positive load cell loading is shown by arrow F at the floor anchor 392. The forces indicated by arrows E and F are produced, for example, by tightening seat belt 390 on a child, a child seat, an underweight adult, an object and the like. It has been discovered that a differential loading can be derived from the weights sensed by the rr and rl weight transducers and used to indicate a weight compensation for the weight in seat 380 derived from all four of the weight transducers 320 of FIG. 10. For instance, the differential loading may simply be the difference between the voltages developed by the rr and rl transducers 320. This voltage difference can be used with a lookup table of weight compensation values to obtain a weight compensation value to compensate for the belt tightening or cinching forces.

The belt loading step sequence also involves a consideration of unusual fore/aft loading conditions as sensed by the front and rear transducers 320. Unusual fore/aft loading can occur in a number of circumstances. For example, an adult may exert a weight on the forward portion of the seat while installing a child seat or while placing a child in the seat. Another example is that a seat occupant may shift to a position, such as a reclining position, that exerts more weight on the rearward mounted load cells or rear portions of the seat. Should such conditions be sensed, procedure 200 will enter a low risk sequence as discussed below.

Referring again to FIG. 9, after step 212 determines that the buckle time period has not expired, step 220 determines if the lateral difference between the voltages sensed by the rr and rl transducers exceeds a threshold y. If yes, step 222 determines the weight adjustment required for belt cinching forces and makes the adjustment to the sensed weight. For the case where the occupant is a child whose weight is determined equal to or greater than 36 kilograms by step 204, the adjustment by step 222 will be enough to cause the adjusted weight to be less than 36 kilograms. Step 224 will then determine that the adjusted weight is less than 36 kilograms. Step 226 records the status to this point of the procedure. Procedure 200 then goes to the buckled child procedure 189 (FIG. 8).

If step 224 determines that the adjusted weight is still equal to or greater than 36 kilograms, step 225 determines if the buckle has been reset. If no, step 227 determines if the motor vehicle door is open. If yes, a low risk restraint enabling process is entered at step 228. Step 228 enables a low risk activation of the IPR or air bag. The low risk activation, for example, may involve a limited inflation, a staged limited inflation or other inflation process that is less than a complete inflation. Steps 230 and 232 then enable the ALR and the pre-tensioner. Step 234 determines if this is the first cycle of the loading step sequences during the buckle time period. If yes, step 236 issues an audible alert and step 238 issues a visual alert. During subsequent cycles, step 234 will determine that it is not the first cycle and step 236 is omitted. Step 240 then records status of the procedure to this point.

Step 214 then determines if the adjusted weight is less than 38 kilograms. Step 214 uses 38 kilograms rather than 36 kilograms to permit more adjustment tests by steps 220 and 222 to validate the occupant is a child. If yes, step 242 determines if the buckle time period has expired. If yes, procedure 200 remains in the low risk sequence of steps 228, 230, 232, 234, 238, 240, 214 and 242 until such time as step 214 determines that the weight is equal to or greater than 38 kilograms or the belt is unbuckled which will reset procedure 200 to start (FIG. 9).

If step 242 determines that the buckle time period has not expired, step 220 is again performed. If the belt tightening lateral difference is still greater than y, steps 222 and 224 are performed again with respect to the weight as measured by a weight sensor system. If step 224 determines that the adjusted weight is equal to or greater than 36 kilograms, step 227 again determines if the door is open. If yes, procedure 200 continues in the sequence of steps 228, through 240, 214, 242, 220, 222, 224, 225 and back to step 226. If the door has been closed, step 240 records the status. Procedure 200 continues in ensuing cycles during the buckle time period with the sequence of steps 214, 242, 220, 222, 224, 225, 226 and 240 until the buckle time has expired. If the weight becomes 38 kilograms or higher, procedure 200 goes to step 216. If the weight becomes less than 36 kilograms, procedure 200 goes to the buckled child procedure 189 (FIG. 8). If the buckle time period expires with the weight in the range of 36 to 37 kilograms, step 242 alters the sequence to the low risk sequence of steps 214, 242, 228, 230, 232, 234, 238 and 240. If step 225 determines the buckle is reset at any time during these cycles, step 229 resets the ALR and procedure 200 returns to start. Optionally steps 225 and 229 may be omitted.

For the case where belt tightening is insignificant, step 220 determines that the lateral difference is not greater than the threshold. Step 244 then determines if the fore/aft difference is greater than a threshold z. If yes, the low risk sequence is entered at step 228 and exited to step 214. Procedure 200 will continue to cycle in the sequence of steps 214, 242, 220, 244 and the low risk process during the buckle time period. When the buckle time period expires, the determination of step 242 will be yes and the cycling will continue in the sequence of the low risk process, steps 214 and 242. This assures that the occupant who may be reclining is subjected to a low risk air bag inflation procedure.

If step 114 determines that the seat belt is extended, step 246 then determines if the seat belt extension is greater than a predetermined amount s. If no, procedure 200 returns to the sequence of steps 116, 118, 218, 120, 122, 100, 212, 214, 216, 214 and 246. If step 246 determines that the seat belt extension is greater than s, step 248 determines if the buckle has been reset. If yes, step 250 resets the ALR and procedure 200 returns to start. If step 248 determines that the buckle has not been reset, step 252 enables MALR. Step 254 determines if the buckle time period has expired. If yes, procedure 200 enters the low-risk air bag inflation procedure with step sequence of 228, 230, 232, 234, 238, 240, 214, 216, 248, 252 and 254. Procedure 200 remains in the low risk inflation procedure until such time as step 248 determines the buckle has been reset.

If step 254 determines the buckle time period has not expired, step 256 step 256 determines if the lateral difference between the voltages sensed by the rr and rl transducers exceeds a threshold y. If yes, step 258 determines the weight adjustment required for belt tightening forces and makes the adjustment to the sensed weight. For the case where the occupant is a child whose weight is determined equal to or greater than 36 kilograms by step 204, the adjustment by step 258 will be enough to cause the adjusted weight to be less than 36 kilograms. Step 260 will then determine that the adjusted weight is less than 36 kilograms. Step 264 records the status to this point of the procedure. Procedure 200 then goes to the buckled child procedure 189 (FIG. 8).

If step 256 determines that the lateral difference is equal to or less than y, step 262 records status and step 244 determines if the fore aft difference is greater than z. If not, step 224 determines if the weight is less than 36 kilograms. If yes, procedure 200 records status at step 226 and goes to the buckled child procedure (FIG. 8). If no, step 225 checks for buckle reset. If no, procedure continues in a sequence of steps 227, 24, 214, 216, 248, 252, 254, 256, 262, 244, 224 and 225 until the buckle time expires. Then procedure 200 enters the low risk inflation procedure of the sequence of steps 154, 228, 130, 132, 234, 238, 240, 214, 216, 248 and 252. This sequence continues until step 248 determines that the buckle has been reset.

The present invention having been thus described with particular reference to the preferred forms thereof, it will be obvious that various changes and modifications may be made therein without departing from the spirit and scope of the present invention as defined in the appended claims.

What is claimed is:

1. A method of managing the enablement and disablement of occupant restraints in a motor vehicle, said method comprising:
(a) determining if a seat belt of a seat is buckled or unbuckled;
(b) determining if a weight in the seat is less then a threshold weight or is equal to or greater than the threshold weight:
(c) in response to the determination of steps (a) and (b), enabling at least one occupant restraint of the group that consists of an automatic locking restraint, a pre-tensioner and an air bag,
(d) if the seat belt is buckled and the weight in the seat is less than threshold weight, disabling the air bag and activating the automatic locking restraint upon sensing a high g event, and activating the pre-tensioner after activating the automatic locking restraint;

(e) if the seat belt is unbuckled and the weight in the seat is less than the threshold weight, disabling the air bag and the pre-tensioner;

(f) if the seat belt is unbuckled and the weight in the seat is equal to or greater than the threshold weight, disabling the pre-tensioner and activating air bag upon sensing a high g event; and (g) if the seat belt is buckled and the weight in the seat is equal to or greater than the threshold weight, activating the automatic locking restraint upon sensing a high g event, activating the pre-tensioner after activating the automatic locking restraint, and activating the air bag after activating the pre-tensioner.

2. The method of claim 1, further comprising:

(h) if step (a) determines that the seat belt is buckled and step (b) determines that said weight in said seat is equal to or greater than said threshold, determining if the seat belt is extended and, if not, performing step (g); and (i) if step (h) determines that the seat belt is extended, disabling said air bag and enabling said automatic locking restraint and said pre-tensioner.

3. The method of claim 1, further comprising:

(j) if step (a) determines that the seat belt is buckled and step (b) determines that said weight in said seat is less than said threshold, enabling said air bag to inflate with a procedure that provides a soft inflation impact on said occupant.

4. The method of claim 3, further comprising signaling an alert if step (j) is performed.

5. The method of claim 1, further comprising:

(k) determining a weight in said seat as measured by a weight sensor system;

(l) if said weight is greater than a threshold weight, determining if said seat belt is tightened;

(m) if step (l) determines that said seat belt is tightened, determining an adjusted weight; and wherein step (c) enables said at least one occupant restraint dependent on a comparison of said adjusted weight and said threshold weight.

6. The method of claim 5, wherein step (l) determines seat belt tightening by comparing values measured by said sensor system at about the rear right and rear left of said seat.

7. The method of claim 6, wherein step (m) derives said adjusted weight from said values.

8. The method of claim 7, wherein step (m) determines said adjusted weight only if the difference between said values is greater than a predetermined amount.

9. The method of claim 5, wherein steps (l) and (m) are repeated until a predetermined time has expired from the time the seal has been buckled.

10. The method of claim 5, further comprising:

(n) if step (a) determines that the seat belt is buckled and step (b) determines that said weight in said seat is equal to or greater than said threshold, determining if the seat belt is extended and, if not, performing step (d); and (o) if step (n) determines that the seat belt is extended, enabling a manual locking restraint.

11. The method of claim 10, further comprising:

(p) enabling said air bag with an inflation procedure that provides a soft inflation impact on said occupant.

12. A system for managing the enablement and disablement of occupant restraints on an occupant in a seat having a seat belt in a motor vehicle, said system comprising:

a plurality of occupant restraints selected from the group consisting of an automatic locking restraint, a pre-tensioner and an air bag device;

a processor, a memory and a bus that interconnects said processor, said memory and said plurality of occupant restraints;

a load management procedure stored in said memory that controls said processor to perform the following steps:

(a) determining if said seat belt is buckled or unbuckled;

(b) determining if a weight in the seat is less than a threshold weight or is equal to or greater than the threshold weight;

(c) in response to the determination of steps (a) and (b), enabling at least one said occupant restraints;

(d) if the seat belt is buckled and the weight in the seat is less than threshold weight, disabling the air bag and activating the automatic locking restraint upon sensing a high g event, and activating the pre-tensioner after activating the automatic locking restraint;

(e) if the seat belt is unbuckled and the weight in the seat is less than the threshold weight, disabling the air bag and the pre-tensioner;

(f) if the seat belt is unbuckled and the weight in the seat is equal to or greater than the threshold weight, disabling the pre-tensioner and activating the air bag upon sensing a high g event: and (g) if the seat belt is buckled and the weight in the seat is equal to or greater than the threshold weight, activating the automatic locking restraint upon sensing a high g event, activating the pre-tensioner after activating the automatic locking restraint, and activating the air bag after activating the pre-tensioner.

13. The system of claim 12, said load management procedure further comprising:

(h) if step (a) determines that the seat belt is buckled and step (b) determines that said weight in said seat is equal to or greater than said threshold, determining if the seat belt is extended and, if not, performing step (g); and (i) if step (h) determines that the seat belt is extended, disabling said air bag and enabling said automatic locking restraint and said pre-tensioner.

14. The system of claim 12, said load management procedure further comprising:

(j) if step (a) determines that the seat belt is buckled and step (b) determines that said weight in said seat is less than said threshold, enabling said air bag to inflate with a procedure that provides a soft inflation impact on said occupant.

15. The system of claim 14, said load management procedure further comprising signaling an alert if step (j) s performed.

16. The system of claim 12, said load management procedure further comprising:

(k) determining a weight in said seat as measured by a weight sensor system;

(l) if said weight is greater than a threshold weight, determining if said seat belt is tightened;

(m) if step (l) determines that said seat belt is tightened, determining an adjusted weight; and wherein step (c) enables said at least one occupant restraint dependent on a comparison of said adjusted weight and said threshold weight.

17. The system of claim 16, step (l) determines seat belt tightening by comparing values measured by said sensor system a:about the rear right and rear left of said seat.

18. The system of claim 17, wherein step (m) derives said adjusted weight from said values.

19. The system of claim 18, wherein step (m) determines said adjusted weight only if the difference between said values is greater than a predetermined amount.

20. The system of claim 16, wherein steps (l) and (m) are repeated until a predetermined time has expired from the time the seat has been buckled.

21. The system of claim 12, said load management procedure further comprising:

(n) if step (a) determines that the seat belt is buckled and step (b) determines that said weight in said seat is equal to or greater than said threshold, determining if the seat belt is extended and, if not, performing step (g); and (o) if step (n) determines that the seat belt is extended, enabling a manual locking restraint.

22. The system of claim 21, said load management procedure further comprising:

(o) enabling said air bag with an inflation procedure that provides a soft inflation impact on said occupant.

* * * * *